(12) United States Patent
Shin et al.

(10) Patent No.: US 9,494,788 B2
(45) Date of Patent: Nov. 15, 2016

(54) ELECTROWETTING DISPLAY DEVICE AND DRIVING METHOD THEREOF

(75) Inventors: Sang Min Shin, Suwon-si (KR);
Chang Ku Hua, Hwaseong-si (KR);
Woo Song Kim, Hwaseong-si (KR);
Uk Chul Choi, Cheonan-si (KR);
Mun-Soo Park, Suwon-si (KR);
So-Hyun Lee, Hwaseong-si (KR)

(73) Assignee: Amazon Technologies, Inc., Seattle, WA (US)

( * ) Notice: Subject to any disclaimer, the term of this patent is extended or adjusted under 35 U.S.C. 154(b) by 42 days.

(21) Appl. No.: 13/560,861

(22) Filed: Jul. 27, 2012

(65) Prior Publication Data

US 2013/0215095 A1   Aug. 22, 2013

(30) Foreign Application Priority Data

Feb. 17, 2012   (KR) .................. 10-2012-0016454

(51) Int. Cl.
*G06F 3/038* (2013.01)
*G09G 5/00* (2006.01)
*G02B 26/00* (2006.01)
*G09G 3/34* (2006.01)

(52) U.S. Cl.
CPC ............ *G02B 26/005* (2013.01); *G06F 3/038* (2013.01); *G09G 3/348* (2013.01); *G09G 2300/08* (2013.01)

(58) Field of Classification Search
None
See application file for complete search history.

(56) References Cited

U.S. PATENT DOCUMENTS 7,123,796 B2 *  10/2006  Steckl et al. .................. 385/40
7,163,612 B2 *  1/2007   Sterling et al. ............. 204/600
7,561,131 B2     7/2009   Ijzerman et al.
(Continued)

FOREIGN PATENT DOCUMENTS

CN   101419779    4/2009
JP   2007508576   4/2007
(Continued)

OTHER PUBLICATIONS

Translated Chinese Office Action mailed Mar. 30, 2016 for Chinese patent application No. 201210383064.5, a counterpart foreign application of U.S. Appl. No. 13/560,861, 17 pages.
(Continued)

*Primary Examiner* — Srilakshmi K Kumar
*Assistant Examiner* — Stephen T Reed
(74) *Attorney, Agent, or Firm* — Lee & Hayes, PLLC

(57) ABSTRACT

A display device includes a first electrode, a second electrode, a third electrode, a lyophobic layer, a first liquid, and a second liquid, where the lyophobic layer is lyophobic to the second liquid. A method of driving the display device includes: providing a first potential difference between the first electrode and the third electrode to thereby cause the first liquid to begin moving toward the second electrode; providing a second potential difference between the second electrode and the third electrode while reducing the first potential difference to thereby cause the first liquid to move toward the first electrode; and removing the second potential difference to thereby cause the first liquid to slow down in its movement toward the first electrode or to stop in its movement toward the first electrode.

16 Claims, 16 Drawing Sheets

(56) References Cited

U.S. PATENT DOCUMENTS

| | | | |
|---|---|---|---|
| 7,583,426 B2 * | 9/2009 | Shin | 359/253 |
| 7,800,816 B2 | 9/2010 | Hayes et al. | |
| 7,847,996 B2 * | 12/2010 | Chen et al. | 359/228 |
| 7,898,714 B2 | 3/2011 | Hagood, IV et al. | |
| 8,154,486 B2 | 4/2012 | Feenstra et al. | |
| 2007/0031097 A1 * | 2/2007 | Heikenfeld et al. | 385/129 |
| 2008/0198292 A1 | 8/2008 | Marra et al. | |
| 2008/0274513 A1 | 11/2008 | Shenderov et al. | |
| 2008/0278434 A1 | 11/2008 | Van Dijk et al. | |
| 2009/0027317 A1 | 1/2009 | Cheng et al. | |
| 2009/0034054 A1 * | 2/2009 | Ikegami et al. | 359/296 |
| 2009/0195850 A1 * | 8/2009 | Takahashi | 359/226.3 |
| 2009/0289968 A1 * | 11/2009 | Yoshida | 345/691 |
| 2010/0053234 A1 | 3/2010 | Boom et al. | |
| 2010/0079434 A1 | 4/2010 | Boom et al. | |
| 2010/0177022 A1 * | 7/2010 | Teranishi et al. | 345/72 |
| 2010/0236927 A1 * | 9/2010 | Pope et al. | 204/450 |
| 2011/0032276 A1 | 2/2011 | Chen et al. | |
| 2011/0205259 A1 * | 8/2011 | Hagood, IV | 345/690 |
| 2012/0268804 A1 * | 10/2012 | Hadwen | 359/290 |

FOREIGN PATENT DOCUMENTS

| | | |
|---|---|---|
| JP | 2007511782 | 5/2007 |
| JP | 2008-197296 A | 8/2008 |
| JP | 2009211047 | 9/2009 |
| JP | 2010-107908 A | 5/2010 |
| JP | 2010152317 | 7/2010 |
| KR | 1020080041483 A | 5/2008 |
| KR | 1020080111658 A | 12/2008 |
| KR | 1020090021425 A | 3/2009 |
| KR | 1020110040462 A | 4/2011 |
| KR | 1020110074087 A | 6/2011 |
| TW | 200840173 | 10/2008 |

OTHER PUBLICATIONS

Japanese Office Action mailed Aug. 30, 2016 for Japanese Patent Application No. 2012-252601, a counterpart foreign application of U.S. Appl. No. 13/560,861.

* cited by examiner

ELECTROWETTING DISPLAY DEVICE AND DRIVING METHOD THEREOF

RELATED APPLICATIONS

This application claims priority to and the benefit of Korean Patent Application No. 10-2012-0016454 filed in the Korean Intellectual Property Office on Feb. 17, 2012, the entire contents of which application are incorporated herein by reference.

BACKGROUND

1. Field of Disclosure

The present disclosure of invention relates to an electrowetting display device and a driving method thereof.

2. Description of Related Technology

An electrowetting display device can be made to display a desired image by using a combination of a body of a polar liquid and a body of a non-polar liquid, where the two liquids are immiscible with each other. The electrowetting display device includes spaced apart upper and lower panels, a plurality of cells between the panels and divided from one another by interposed partition walls. Each cell includes a respective polar body of liquid and a non-polar body of liquid, both disposed in a space between the opposing panels. A pair of electrodes are provided in each cell for selectively applying electric fields that affect how the polar body of liquid and the non-polar body of liquid are disposed relative to one another and between the respective panels. A lyophobic layer is disposed on one of the electrodes of the cell. Since the lyophobic layer tends to push away from itself (repel) the polar liquid, the non-polar liquid tends to occupy the space between the repelled polar liquid and the repelling lyophobic layer.

When an appropriate electric field is applied in a region between the electrodes, the polar liquid may be urged by the electric field to move out of its normal position towards the surface of the otherwise repelling lyophobic layer and the non-polar liquid may swap position so as to gather in the place previously (and normally) occupied by the polar liquid. When this position swapping electric field is removed, the polar liquid is again repelled by the lyophobic layer and caused to move away from the surface of the lyophobic layer. In this case, the previously gathered non-polar liquid may return to its normal position to spread out along the surface of the lyophobic layer. The electrowetting display device uses the above-described phenomenon as well as an optical dyeing of the non-polar liquid in such a way that an area covered by the non-polar liquid containing the dye is selectively adjusted to thereby control the transmittance of light passing through the cell, thereby displaying a desired image.

Since the electrowetting display device does not use a polarizer for realizing its optical effects, it has a transmittance efficiency of light better than that of a liquid crystal display (LCD) which does use a polarizer for realizing its optical effects. However, the response time of the electrowetting display device to changing image signals is relatively large and thus it may be hard for the electrowetting display device to support fast moving (fast changing) images. In particular, it may take more time after gathering thereof, to again spread out the gathered non-polar liquid than to gather the non-polar liquid in the first place.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

A display device includes a first electrode, a second electrode spaced apart from the first electrode, a lyophobic layer on the first and second electrodes, a third electrode spaced apart from and facing the lyophobic layer, a first liquid disposed in part of a space between the lyophobic layer and the third electrode, and a second liquid disposed in another part of the space, the second liquid being immiscible with the first liquid, the lyophobic layer being lyophobic to the second liquid. A method of driving the display device includes: providing a first potential difference between the first electrode and the third electrode to thereby cause the first liquid to move toward the second electrode; providing a second potential difference between the second electrode and the third electrode while reducing the first potential difference to thereby cause the first liquid to move toward the first electrode; and removing the second potential difference to thereby cause the first liquid to slow down in its movement toward the first electrode or to stop in its movement toward the first electrode.

The first liquid may entirely cover an entire area of the second electrode.

The providing of the second potential difference may include: applying a substantially constant voltage to the third electrode; and applying a pulse-including voltage signal including at least one pulse to the second electrode.

The pulse-including voltage signal may include at least two pulses.

There may be substantially no potential difference between the second electrode and the third electrode during the providing of the first potential difference.

A first voltage signal applied to the first electrode may have a first value during the providing of the first voltage difference and may have a second value different from the first value during the providing of the second potential difference and during the removing of the second potential difference. A second voltage signal applied to the second electrode may have a third value closer to the second value than to the first value during the providing of the first voltage difference, may have a fourth value different from the third value or swings between the third value and the fourth value during the providing of the second potential difference, and may have the third value in the removing the second potential difference, and a voltage applied to the third electrode maintains the third value in the providing a first voltage difference, during the providing of the second potential difference, and during the removing of the second potential difference.

The fourth value may be substantially the same as the first value.

The first, second and fourth value may be disposed on the same side, polarity wise, of the third value.

The first liquid may form a single drop or body of nonpolar first liquid during the providing of the second potential difference and during the removing of the second potential difference.

DETAILED DESCRIPTION

Figure 1:
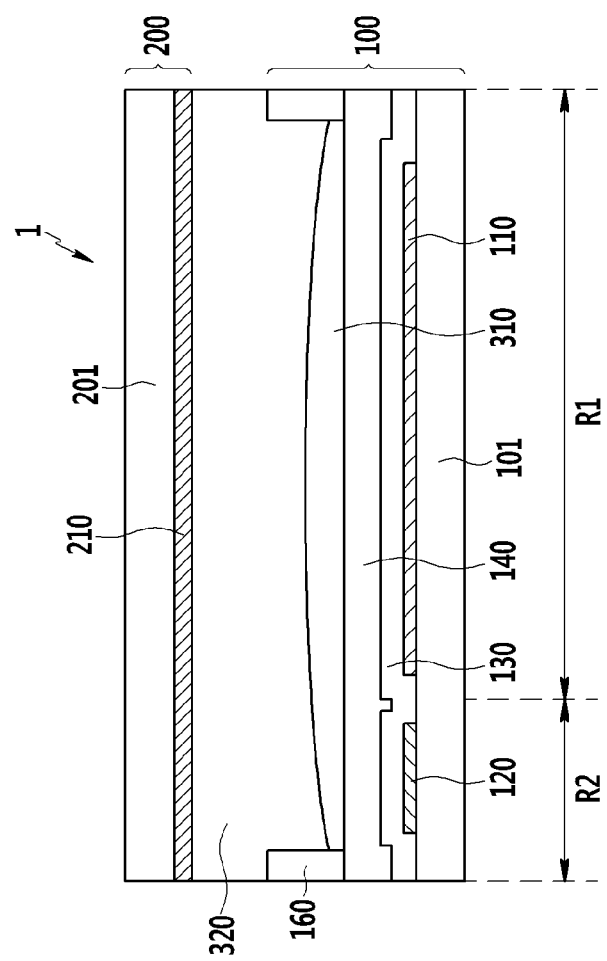
FIGS. 1 and 2 are respective sectional views of an electrowetting display device in accordance with the present disclosure where the device is respectively in different first and second grayscale states.

Aspects of the present disclosure will be described more fully hereinafter with reference to the accompanying drawings. As those skilled in the art would realize after appreciating the present disclosure, the described embodiments may be modified in various different ways, all without departing from the spirit or scope of the present teachings. In the drawing, parts having no relationship with the explanation are omitted for clarity, and the same or similar reference numerals designate the same or similar elements throughout the specification.

An electrowetting display device according to an embodiment is described in detail with reference to FIG. 1 and FIG. 2.

Figure 2:
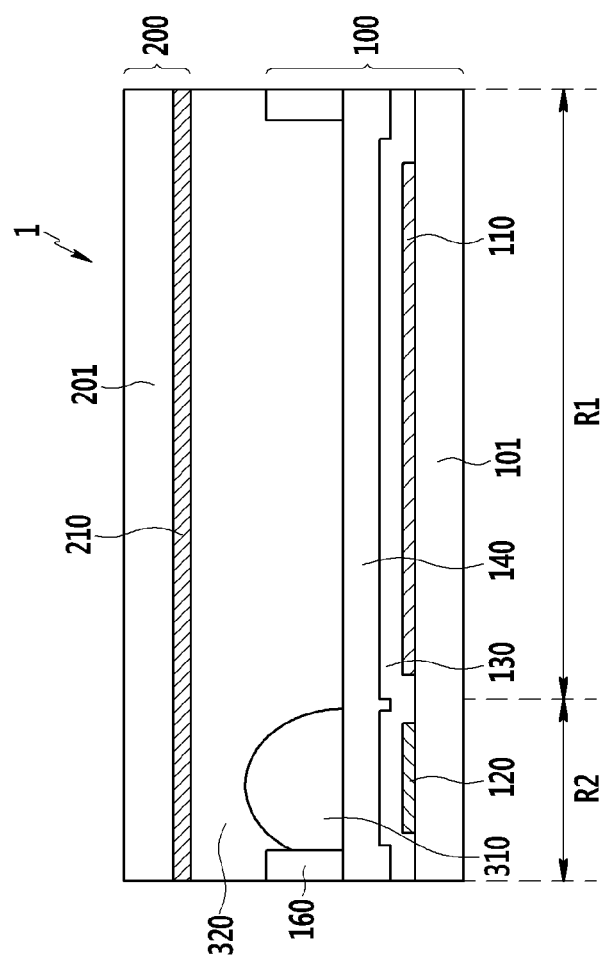

FIG. 1 and FIG. 2 are respective sectional views of an electrowetting display device in accordance with the disclosure but having respectively different first and second grayscale states. Although FIG. 1 and FIG. 2 show just one exemplary cell of an electrowetting display device, the electrowetting display device may include a plurality of such cells repeatedly arranged in rows and columns.

Referring to FIG. 1 and FIG. 2, an electrowetting display device 1 according to the present disclosure includes a first panel 100 (lower panel) and a second panel 200 (upper panel) that are spaced apart and face each other. A generally unmixed combination of a first body of first liquid 310 and a second body of second liquid 320 is disposed between the first panel 100 and the second panel 200. The first panel 100 includes a first substrate 101, a first electrode 110, a second electrode 120, a protection layer 130, a lyophobic layer 140, and as illustrated, laterally opposed parts of a corresponding one or more partition walls 160 between which a first liquid 310 is confined. The second panel 200 includes a second substrate 201 and a third electrode 210. The first substrate 101 may include a transparent material, for example, glass, plastic, etc. Although not shown, a backlighting unit may be provided under the light-passing first substrate 101 for providing a white and/or otherwise colored backlight whose passed-through luminance is to be controlled (e.g., partially or fully shuttered) by a selectively moved dye provided within the illustrated electrowetting cell unit.

The first electrode 110 and the second electrode 120 are disposed on the first substrate 101, and each may include a transparent electrical conductor, such as for example, one made of indium tin oxide (ITO) or indium zinc oxide (IZO). The first electrode 110 and the second electrode 120 are laterally spaced apart from one another and also electrically separated from each other. The first electrode 110 and the second electrode 120 may be disposed on the same insulative layer (e.g., 101) and may be composed of a same conductive and transparent material that during fabrication is deposited as a single layer and thereafter patterned to define the spaced apart and electrically insulated from one another, first and second electrodes, 110 and 120.

The first panel 100 may further include first and second switching elements (not shown, e.g., transistors) that are operated to apply respective voltages, respectively to the first electrode 110 and the second electrode 120. The first and the second switching elements may be thin film field effect transistors (TFTs), and may be formed such that they are integrally disposed on the first substrate 101 and monolithically connected to the first electrode 110 and the second electrode 120, respectively.

The first panel 100 may further include an insulating layer (not shown) disposed above the first and the second switching elements for electrically insulating parts of the switching elements as may be appropriate for proper device operation.

The protection layer 130 that is electrically insulative may be disposed on the first electrode 110 and the second electrode 120, and may include an insulator such as a silicon oxide ($SiO_x$). The protection layer 130 may be structured so as to reduce or prevent the second liquid 320 from being electrolyzed due to an electrical current that otherwise might undesirably pass between the third electrode 210 and the first and second electrodes 110 and 120 when the voltages are respectively applied. In one embodiment, the protection layer 130 may be omitted and the next-described, lyophobic layer 140 may directly contact the first and second electrodes, 110 and 120.

The lyophobic layer 140 is disposed on and is laterally covering the protection layer 130 in the illustrated embodiment. The lyophobic layer 140 includes a surface material that is lyophobic to (repelling of, non-wettable by, or not easily wettable by) the second liquid 320. The lyophobic layer 140 may include a fluoropolymer, for example. A top surface of layer 140 may be lyophillic with respect to the first liquid 310.

The one or more partition wall(s) 160 may be disposed on the lyophobic layer 140, to form respective, tubular containment areas and thereby partition the electrowetting display device 1 into a plurality of alike cells each having a respective confinement area in which it confines its respective body of the first liquid 310. The partition wall(s) 160 may include a cured photosensitive resin, and may further include a light blocking material such as black carbon. The inward sidewall surfaces of the partition wall(s) 160 may include a material that is easily wetted by the first liquid 310.

In other words, the inward sidewall surfaces of the partition wall(s) 160 may be lyophillic with respect to the first liquid 310.

The second substrate 201 faces the first substrate 101, and may include a transparent material, for example, glass, plastic, etc.

The third electrode 210 is disposed on the second substrate 201, and is operatively coupled to receive a voltage signal where the latter may be used to generate an electric field along with the first and second electrodes 110 and 120. The third electrode 210 may include a transparent conductor, for example, made of ITO or IZO.

The substrates 101 or 201 may support their respective electrode(s) 110, 120 or 210 as well as the lyophobic layer 140. In one embodiment, the upper substrate 210 may be omitted.

The first liquid 310 (also referred to herein as the first body of first liquid 310) generally remains unmixed with the second liquid 320 and it is normally disposed (in a relaxed state) as a thin, spread out body of liquid (not gathered or coalesced) in the lower portion of the spacing between the first and second panels 100 and 200, in other words, in the region surrounded by the opposed partition wall parts 160. The first liquid 310 may include a nonpolar liquid, for example, an oil like decane, and it may further have a nonpolar dye dissolved in it and having a dark color such as black for example or another color. According to another embodiment, the first liquid 310 may include a dye having a bandpass characteristic that selectively passes or blocks one of three primary colors, for example, red, green, and blue.

The second liquid 320 is immiscible with the first liquid 310, and it is filled into the remainder of the inter-panels space surrounded by the first panel 100, the second panel 200, and the first liquid 310. The second liquid 320 may be optically relatively clear so as to let visible light pass therethrough with little if essentially no absorption.

If there are no other forces acting on the liquid 310 and 320, the nonpolar first liquid 310 tends to wet the top surface of layer 140 as well as the inward sidewall surfaces of the partition wall(s) 160 while the polar second liquid 320 is repelled by the lyophobic layer 140.

Although not shown, the display device may include a reservoir holding excess amount of the second liquid 320 and a resilient means (e.g., a compressible gas) which flexes in response to thermal or other expansions and contractions of the second liquid 320. The second liquid 320 may include or consist of a polar liquid that is naturally repelled by the surface material of the lyophobic layer 140 and thus, when not otherwise forced to the opposite, the second body of liquid 320 naturally tends to dispersively locate itself far apart from the lyophobic layer 140. However, the second liquid 320 is responsive to, and thus movable by an appropriately oriented electric field when the latter is applied. As an example, the second liquid 320 may include a mixture of ethylene glycol and glycerine.

FIG. 1 shows a relaxed or normal state (R) in which the first liquid 310 covers an entire area of the cell. According to one embodiment, for this relaxed state to occur, there may be no electric field in the space between the first panel 100 and the second panel 200. For example, the voltages applied to the first and second electrodes 110 and 120 and the third electrode 210 may all be substantially equal to each other (V1(R)=V2(R)=V3(R)) such that there is no potential difference between the three. Since under this condition second liquid 320 tends to naturally dispose itself away from the lyophobic layer 140, the dye-containing first liquid 310 will tend towards a relaxed state as being substantially uniformly interposed between the lyophobic layer 140 and the second liquid 320 such that the first liquid 310 substantially covers the entire upper surface of the lyophobic layer 140 of the respective cell (pixel) as is shown in FIG. 1.

FIG. 2 shows a non-relaxed or strained state (S) where the first liquid 310 covers only a portion of the cell.

According to an embodiment, there may be a potential difference between the first electrode 110 and the second and third electrodes 120 and 210 and there may be substantially no potential difference between the second electrode 120 and the third electrode 210. In this case, an electric field generated by the potential difference between the first electrode 110 and the second and third electrodes 120 and 210 may be relatively strong in a region R1 between the first electrode 110 and the third electrode 210 and relatively weak or nonexistent in a region R2 between the second electrode 120 and the third electrode 210. Therefore, a relatively large number of electric charges may opposingly gather near a surface of the first electrode 110 and near a surface portion of the third electrode 210 corresponding to the first electrode 110.

Since the second liquid 320 includes a polar material, dielectric polarization may occur in the second liquid 320 when exposed to an electric field, and thus the second liquid 320 may be attracted to the charges gathered on the surfaces of the electrodes 110, 120 and 210. Since more charges are gathered on the surfaces of the first electrode 110 and the corresponding portion of the third electrode 210 than the surfaces of the second electrode 120 and a corresponding portion of the third electrode 210, the second liquid 320 may be pulled towards proximity with the charged surfaces so that it is gathered (coalesced) adjacent to the surfaces of the first electrode 110 and the corresponding portion of the third electrode 210 more so than adjacent to the second electrode 120 and the corresponding portion of the third electrode 210. Therefore, the second liquid 320 will be urged to move toward and coalesce in the region R1 between the first electrode 110 and the third electrode 210 where the electric charges are crowded. When the produced electric field is sufficiently strong so that the attractive force due to the electric field is stronger than the repulsive force between the second liquid 320 and the lyophobic layer 140, the second liquid 320 may move into that region R1 and may push out (displace) the first liquid 310 normally disposed in that region R1 between the first electrode 110 and the third electrode 210. In response the nonpolar first liquid 310 is displaced (moved to) coalescing in the region R2 above the second electrode 120 while the normally repelled second liquid 320 is electrostatically pulled in to occupy the region R1 between the first electrode 110 and the third electrode 210. Therefore, a region that is no longer covered by the dye-colored first liquid 310 may be formed in the cell in response to formation of an appropriate electrical field within the cell.

For example, it is assumed that the first liquid 310 includes black dyes, and that an external light source (not shown) is disposed under the first substrate 101. The external light source may include a backlight unit, or use an interior lighting, or use a natural light.

Referring to FIG. 1, in that relaxed state (R), light emitted from the light source may be absorbed by the dye(s) of the first liquid 310 that covers an entire area of a cell, and thus the light may not pass through that portion of the electrowetting display device 1 of FIG. 1. Therefore, the electrowetting display device 1 in that portion may display a lowest grayscale level, for example, a black pixel.

Referring to FIG. 2, in that strained state (S), since the coalesced first liquid 310 covers only a portion of the cell, light emitted from the light source is only partly absorbed (or not absorbed at all) and at least partly transmitted through the aperture area of the cell.

As an area occupied by the first liquid 310 becomes smaller, the amount of light that passed through the respective portion of the electrowetting display device 1 becomes greater, and thus the luminance of the display device 1 in that portion becomes higher. For a maximum light transmittance, a highest gray, for example, a white image pixel or a saturated color (e.g., R, G or B) may be displayed.

According to an embodiment, the area occupied by the first liquid 310 may be determined by the strength of the electric field produced between the first panel 100 and the second panel 200, and thus a variety of grays between the lowest grayscale level and the highest grayscale level may be selectively obtained by adjusting the potential difference between the first electrode 110 and the third electrode 210. According to an embodiment, a voltage applied to the third electrode 210 may be substantially fixed to a constant, and a voltage applied to the first electrode 110 may be variably adjusted. Although FIG. 1 shows that the first liquid 310 as covering the entire area of the first electrode 110, the first liquid 310 may cover only a part of the area of the first electrode 110 depending on, for example the value of the voltage applied to the first electrode 110. Similarly, the first liquid 310 may occupy an area larger than that shown in FIG. 2.

Exemplary methods of driving the electrowetting display device shown in FIG. 1 and FIG. 2 according to embodiments are described in detail with reference to FIG. 3 and FIG. 4.

Figure 3:
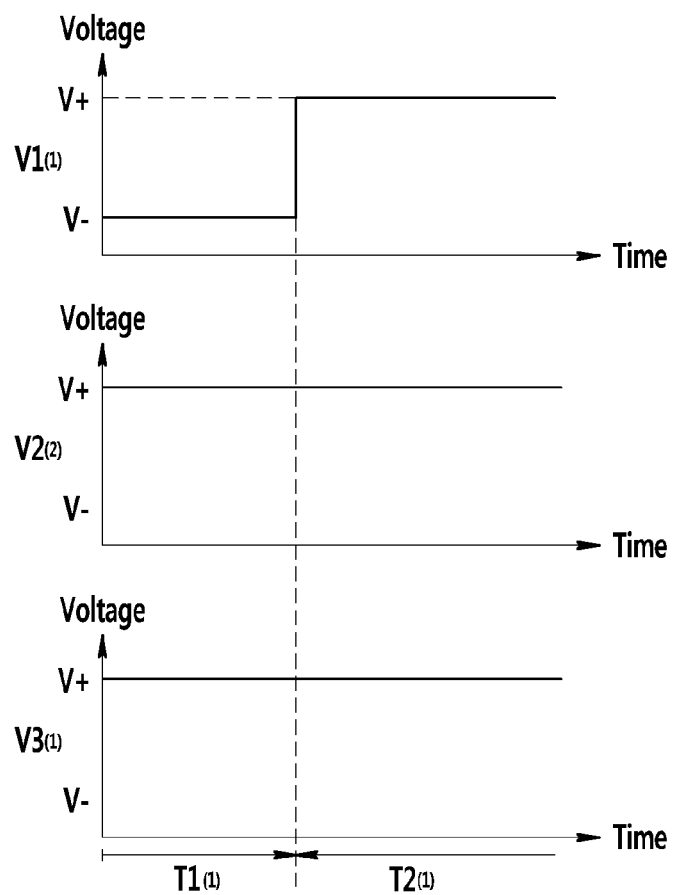
FIGS. 3 and 4 are respective graphs showing driving voltages applied over time to corresponding ones of the electrodes when changing the electrowetting display device between the states shown in FIGS. 1 and 2 respectively.

FIG. 3 is a graph showing respective first driving voltages applied to the electrodes when changing the electrowetting display device from the strained state shown in FIG. 2 to the Relaxed state shown in FIG. 1 according to an embodiment.

Referring to FIG. 3, during a corresponding first period $T1_{(1)}$, voltages $V2_{(1)}$ and $V3_{(1)}$ respectively applied to the second electrode 120 and the third electrode 210 of the electrowetting display device 1 may have substantially the same value V+, and a voltage $V1_{(1)}$ applied to the first electrode 110 may have a value V− lower than the value V+ such that there is a potential difference between the first electrode 110 and the second and third electrodes 120 and 210 and there is no potential difference between the second electrode 120 and the third electrode 210. Then, the first liquid 310 of the electrowetting display device 1 may be urged to move toward the second electrode 120 and to continue to do so until it stops when it reaches the state shown in FIG. 2.

At the beginning of a second period $T2_{(1)}$ after the first period $T1_{(1)}$, the voltage $V1_{(1)}$ of the first electrode 110 may be raised to have the value V+ and becomes substantially the same as the voltages $V2_{(1)}$ and $V3_{(1)}$ applied respectively to the second and third electrodes 120 and 210 to thus eliminate the electric field within the cell. When the electric field vanishes, the repulsive force between the second liquid 320 and the lyophobic layer 140 may relatively strengthen. Then, the second liquid 320 may move away from the surface of the lyophobic layer 140 due to the lyophobic nature of that layer 140, and the first liquid 310 may then spread back over the lyophobic layer 140 to thereby reach or return to the Relaxed (R) state shown in FIG. 1.

Figure 4:
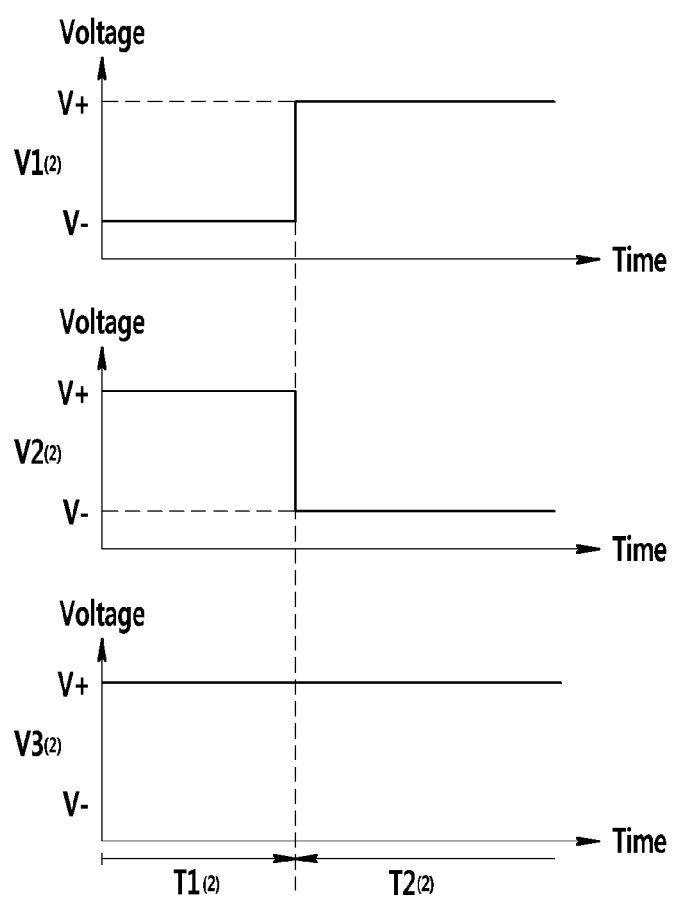

FIG. 4 is a graph showing driving voltages that may be applied to the electrodes when changing the electrowetting display device from the strained state shown in FIG. 2 to the Relaxed state shown in FIG. 1.

Referring to FIG. 4, during a first period $T1_{(2)}$, corresponding voltages $V2_{(2)}$ and $V3_{(2)}$ are respectively applied to the second electrode 120 and the third electrode 210 of the electrowetting display device 1 and these may have substantially the same value V+. On the other hand, a different voltage $V1_{(2)}$ is applied to the first electrode 110 which may have a value V− lower than the value V+ such that there is a potential difference developed between the first electrode 110 and the second and third electrodes 120 and 210 and there is no potential difference present between the second electrode 120 and the third electrode 210. As a result, during the first period $T1_{(2)}$, the first liquid 310 of the electrowetting display device 1 is urged toward greater proximity with the second electrode 120, thus reaching the strained (S) state shown in FIG. 2.

At the beginning of a second period $T2_{(2)}$ of FIG. 4, the voltage $V1_{(2)}$ of the first electrode 110 is raised to have the value V+ and thus becomes substantially the same as the voltage $V3_{(2)}$ applied to the third electrode 210, thereby eliminating the potential difference between the first electrode 110 and the third electrode 210. On the other hand, the voltage $V2_{(2)}$ of the second electrode 120 is lowered to have the value V− which is lower than the voltage values V+ of the first and third electrodes 110 and 210 to thus create a potential difference between the second electrode 120 and the first and third electrodes 110 and 210. Then, the electric field in the region R2 between the second electrode 120 and the third electrode 210 becomes substantially stronger than that in the region R1 between the first electrode 110 and the third electrode 210. Therefore, the polar second liquid 320 is urged to move toward the second electrode 120 and, as a result of that movement, a portion of the first liquid 310 is ousted from that region R2 (over the second electrode 120) and urged toward instead occupying the area over the first electrode 110. After the completion of the movement of the first and second liquids 310 and 320, the Relaxed (R) state shown in FIG. 1 is obtained. According to the operation illustrated in FIG. 4, the second liquid 320 is subjected to a lateral urging force that returns it toward the Relaxed (R) state of FIG. 1 due to the electric field in addition to the repulsive force present between the second liquid 320 and the lyophobic layer 140. As a result of these combined mechanisms, a time for the first liquid 310 to spread back over the first electrode 110 may be shortened compared with the mere relaxing operation illustrated by the operation of FIG. 3.

The operations shown in FIGS. 3 and 4 apply a voltage to the first electrode 110 or the second electrode 120, which is lower than the voltage then applied to the third electrode 210, in order to generate the electric field. However, in an alternate embodiment, the first electrode 110 or the second electrode 120 may be supplied with a voltage higher than the voltage applied to the third electrode 210 rather than lower than the same.

In one experiment, the electrowetting display device 1 shown in FIG. 2 was driven by a first and then a second of the methods described above with reference to FIG. 3 and FIG. 4 and the response time for each was measured, which is described in detail with reference to FIG. 5 and FIG. 6.

Figure 5:
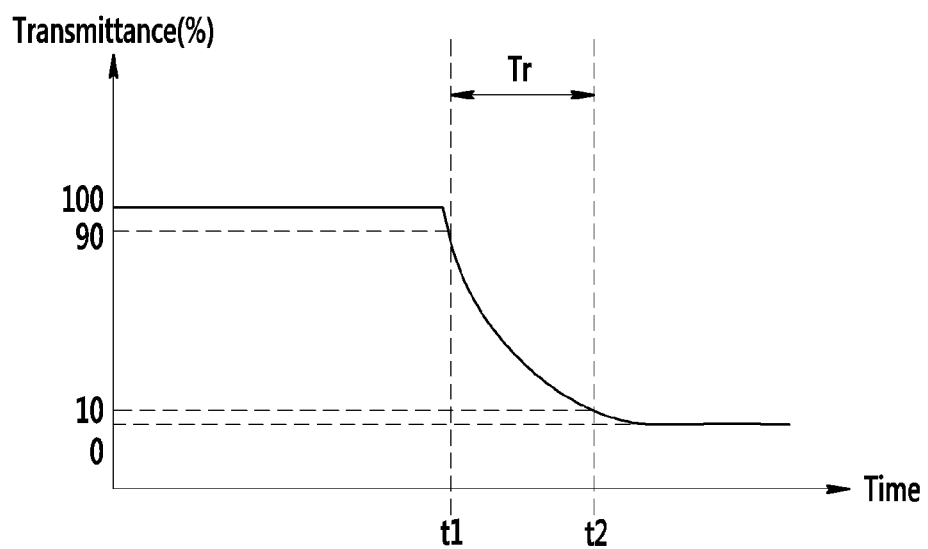
FIG. 5 is a graph showing time versus variation of optical transmittance of an electrowetting display device in accordance with the present disclosure.
Figure 6:
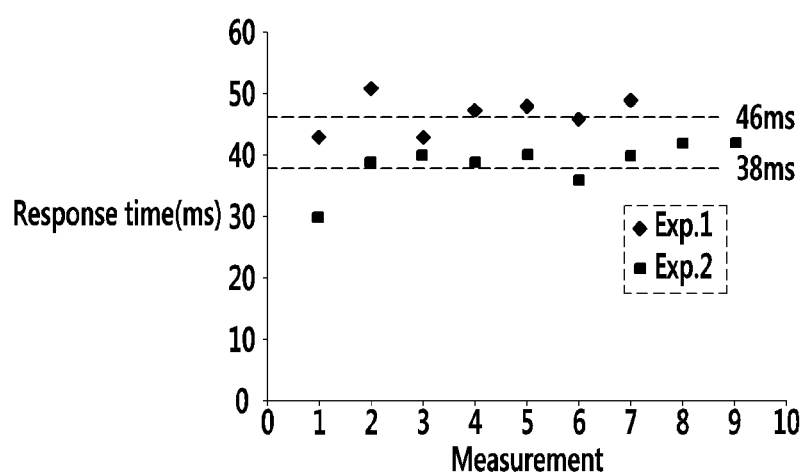
FIG. 6 is a graph showing measured response times of an electrowetting display device driven by methods according to Experiment 1 and Experiment 2.

FIG. 5 is a graph showing time variation of transmittance of an electrowetting display device, and FIG. 6 is a graph showing measured response time of an electrowetting display device driven by methods according to Experiment 1 and Experiment 2.

The "response time" ($T_r$) of FIG. 5 may be defined as a time that it takes for a transmittance to change from about 90% of a reference value to about 10% of the reference value or from about 10% of the reference value to about 90% of the reference value, the reference value being defined as the difference in transmittance between a first gray value G1 and a different second gray value G2 when a gray change is desired from the first gray value G1 to the second gray value G2. The response time Tr shown in FIG. 5 is determined as a time that it takes for the transmittance to reach about 10% from about 90% where predefined maximum and minimum values of the transmittance of a electrowetting display device is denoted by 100% and 0%, respectively.

Referring to FIG. 6, the response times were measured nine times respectively for the illustrated Experiments 1 and 2. In Experiment 1, transition from strained (S) state to Relaxed (R) state was measured while using the driving voltages shown in FIG. 3. For Experiment 2, transition from strained (S) state to Relaxed (R) state was measured while using the driving voltages shown in FIG. 4. Here, V+ was about 15 V, and V− was about −15V relative to a reference voltage. The size of a cell of the electrowetting display device was about 160 μm×160 μm. The average in the measured response time was about 46 ms (milliseconds) for Experiment 1 and about 38 ms for Experiment 2. Stated otherwise, the average response time in Experiment 2 was found to be decreased by about 17% compared with that for Experiment 1.

Next, a method of driving an electrowetting display device according to a further example embodiment is described in detail with reference to FIG. 7.

Figure 7:
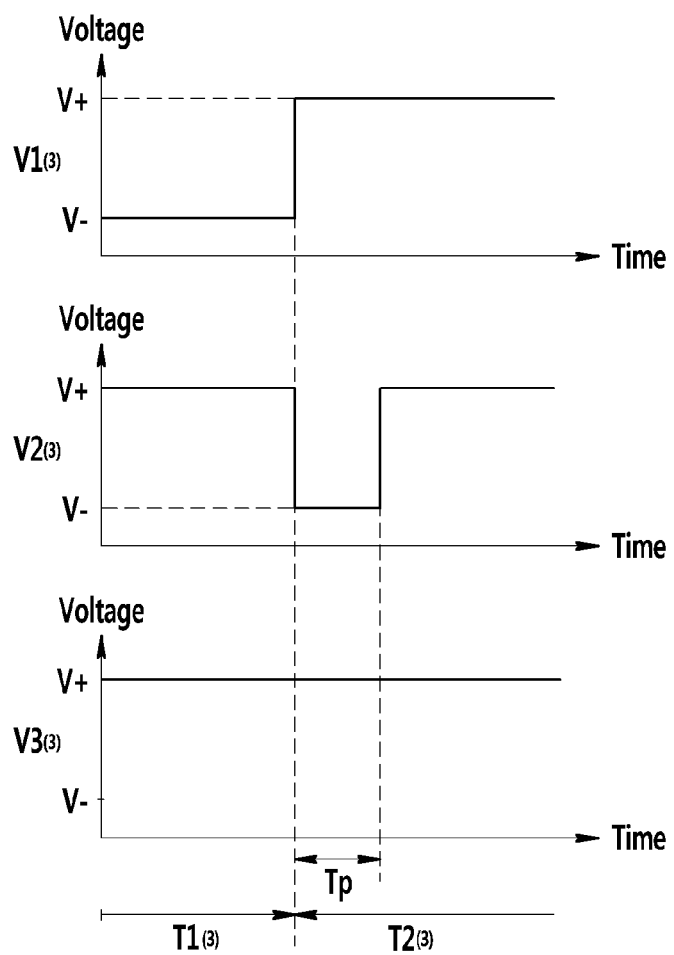
FIG. 7 is a waveform diagram of driving voltages versus time for an electrowetting display device according to example embodiments.

FIG. 7 illustrates waveform diagrams of the respective driving voltages of an electrowetting display device according to this next example embodiment.

Referring to FIG. 7, the value V− of the voltage $V1_{(3)}$ applied to the first electrode 110 is lower than the values V+ of the voltages $V2_{(3)}$ and $V3_{(3)}$ respectively applied to the second and third electrodes 120 and 210 during a first period $T1_{(3)}$, like the above-described embodiments, such that there is a potential difference between the first electrode 110 and the third electrode 210, and there is no potential difference between the second electrode 120 and the third electrode 210. Therefore, the nonpolar (NP) first liquid 310 of the electrowetting display device 1 may move toward the second electrode 120 and may stop to reach the strained (S1) state shown in FIG. 2.

At the beginning of a second period $T2_{(3)}$, the voltage $V1_{(3)}$ applied to the first electrode 110 is raised from V− to V+, and the voltage $V2_{(3)}$ applied to the second electrode 120 is lowered from V+ to V−. The voltage $V2_{(3)}$ of the second electrode 120 maintains the value V− for a duration Tp (referred to as "value changing duration Tp" hereinafter), and it is then raised from V− to V+ again so as to induce a Relaxed (R) state. The voltage $V3_{(3)}$ applied to the third electrode 210 is fixed during both the first period $T1_{(3)}$ and the second period $T2_{(3)}$. Therefore, an electric field above the second electrode 120 may be so strong to accelerate the nonpolar (NP) first liquid 310 to be ousted toward the first electrode 110 during the value changing duration Tp in the second period $T2_{(3)}$. During the rest of the time, there is no electric field in substantially all regions such that the first liquid 310 may move to the first electrode 110 due to the repulsive force between the polar (P) second liquid 320 and the lyophobic layer 140 to cover an entire area of a cell as shown in FIG. 1.

Although FIG. 7 shows that the voltages $V1_{(3)}$ and $V2_{(3)}$ applied to the first and second electrodes 110 and 120 are substantially equal to or lower than the voltage $V3_{(3)}$ of the third electrode 210, the voltages $V1_{(3)}$ and $V2_{(3)}$ of the first and second electrodes 110 and 120 may be substantially equal to or higher than the voltage $V3_{(3)}$ of the third electrode 210. According to an embodiment, the voltages $V1_{(3)}$ and $V2_{(3)}$ may be those shown in FIG. 7 reversed with respect to the voltage $V3_{(3)}$.

The electrowetting display device 1 shown in FIG. 1 and FIG. 2 was driven by the methods described above with reference to FIG. 3, FIG. 4, and FIG. 7, and the response times were measured, which is described in detail with reference to FIG. 8.

Figure 8:
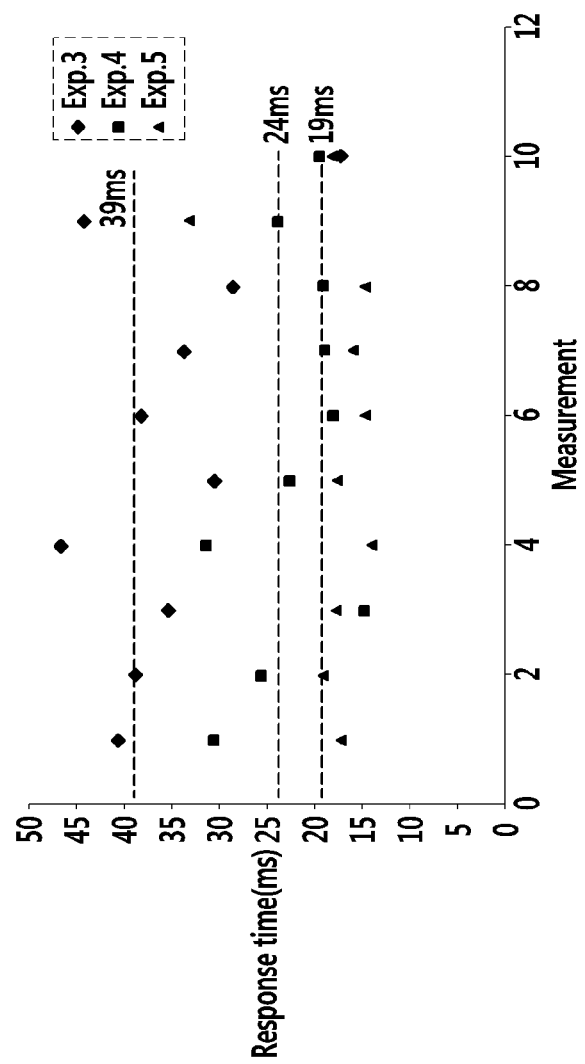
FIG. 8 is a graph showing measured response time of an electrowetting display device driven by methods according to Experiment 3, Experiment 4, and Experiment 5.

FIG. 8 is a graph showing measured response time of an electrowetting display device driven by methods according to Experiment 3, Experiment 4, and Experiment 5. The size of a cell of the electrowetting display device was about 160 μm×160 μm.

Experiment 3 used the driving voltages shown in FIG. 3. Experiment 4 and Experiment 5 used the driving voltages shown in FIG. 7. The value changing duration Tp (shown in FIG. 7) was about 20 ms and about 10 ms in Experiment 4 and Experiment 5, respectively. The average of the measured response time was about 39 ms in Experiment 3 (similar to that of Experiment 2 of FIG. 6). However, the average of the measured response time was about 24 ms in Experiment 4 (Tp=20 ms), and about 19 ms in Experiment 5 (Tp=10 ms). Comparing with Experiment 3 being a base case, it is seen that the response time is reduced by about 38% and about 51% in Experiment 4 and Experiment 5, respectively. It is noted that the value changing duration Tp was smaller than the response time from the results of Experiment 4 and Experiment 5. In addition, the value changing duration Tp in Experiment 4 and Experiment 5 was smaller than the measured response time Tc in Experiment 1 to Experiment 3.

To put the results shown in FIG. 6 and FIG. 8 together, the degree of reduction in the response time in Experiment 4 and Experiment 5 compared with Experiment 3 is greater than the degree of reduction in the response time in Experiment 2 compared with Experiment 1.

As shown in FIG. 6 and FIG. 8, the measured response times varied significantly relative to the computed averages under substantially same driving conditions, and the reasons for the variation relative to the averages was not clearly investigated. It seems that non-uniformity of the cell structure in characteristics such as surface unevenness that may not be measured, or the minute difference in the movements of the first liquid 310 and the second liquid 320 may have contributed to the variations.

The standard deviation of the measured response time shown in FIG. 8 was calculated to be about 9.41 for Experiment 3, about 5.44 for Experiment 4, and about 1.8 for Experiment 5. It may mean that the deviation of the response time is improved by applying the driving methods according to the latter embodiments.

In the above-described Experiments 1 to 5, the driving methods according to the embodiments was applied when the electrowetting display device 1 changes from the highest gray to the lowest gray. However, the driving methods according to the embodiments may be also applied when the electrowetting display device changes from any gray to another gray, for example, from a relatively high intermediate gray to a relatively low intermediate gray.

Figure 9:
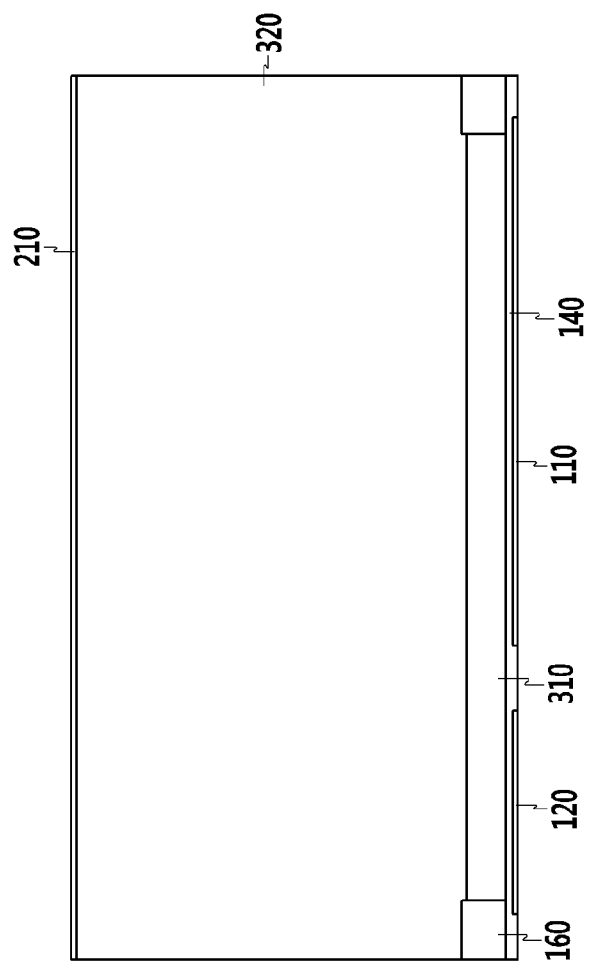
FIG. 9 is a sectional view of an exemplary electrowetting display device.
Figure 10:
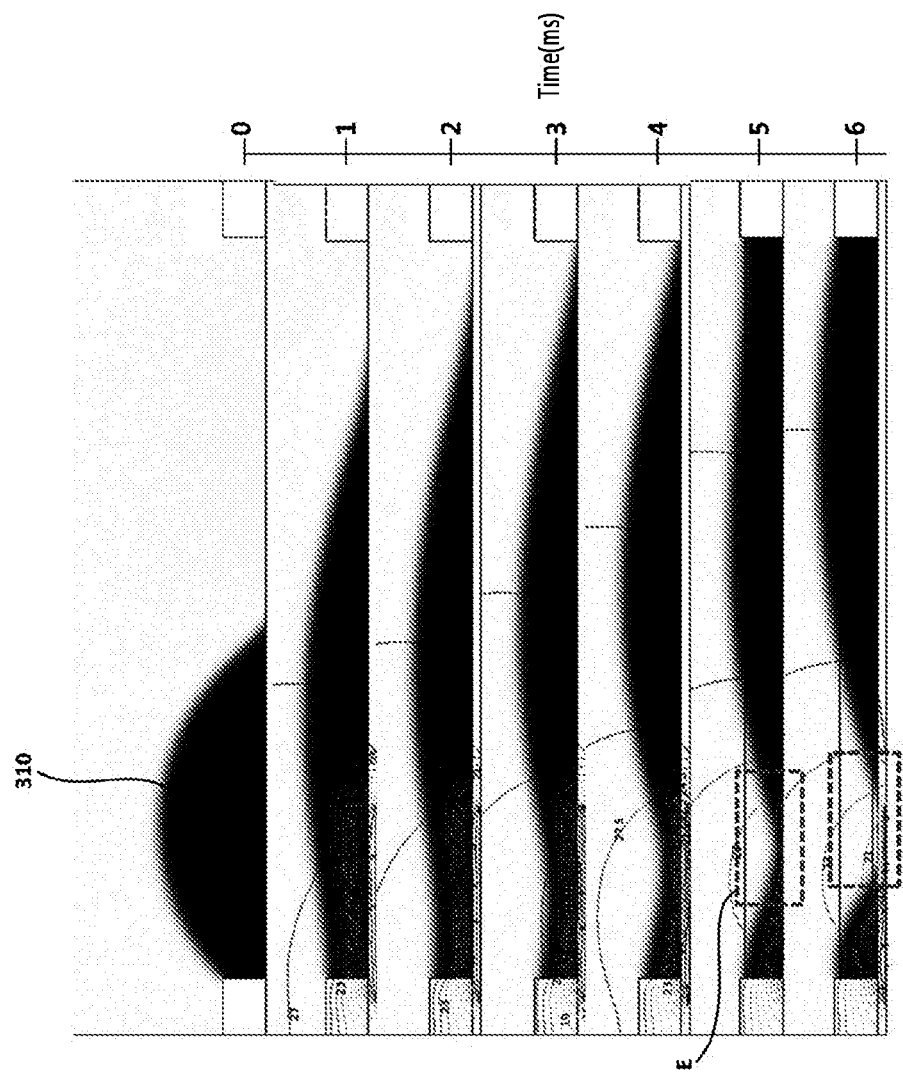
FIG. 10 is a sectional view showing a shape of a first liquid as function of time in a simulation.

FIG. 9 is a sectional view of a second exemplary electrowetting display device, and FIG. 10 is a sectional view showing a shape of a first liquid as function of time in a computer simulation. The structure shown in FIG. 9 is roughly to scale.

Referring to FIG. 9, an electrowetting display device used in this simulation includes a cell including a first electrode 110, a second electrode 120, a lyophobic layer 140, a partition wall 160, and a third electrode 210. An edge of the cell had a length of about 90 µm, a half of the width of the partition wall 160 was about 6.0 µm, and the height of the partition wall 160 was about 4.5 µm. The height from the lyophobic layer 140 to the third electrode 210 was about 44 µm. The density, the viscosity, and the dielectric constant of the second liquid 320 contained in the electrowetting display device were about 1165 kg/m$^3$, about 50 cp, and about 42, respectively. The density, the viscosity, and the dielectric constant of the first liquid 310 contained in the cell were about 730 kg/m$^3$, about 0.93 cp, about 2, respectively. The surface tension of the first liquid 310 and the second liquid 320 was about 0.020 N/m.

The specification of the electrowetting display device in this simulation except for the size of the cell was substantially the same as the specification of the electrowetting display device used the measurements shown in FIG. 6 and FIG. 8. However, the simulation was performed in a two dimensional space rather than three dimensional space, and the length of the cell was about 160 µm.

Referring to FIG. 10, a potential difference was given between the second electrode 120 and the third electrode 210 to generate an electric field when a drop of the first liquid 310 was simulated as being disposed on the lyophobic layer 140 corresponding to the second electrode 120. FIG. 10 shows equipotential lines that are crowded near the second electrode 120.

As a time lapses from the generation of the electric field, the nonpolar (NP) first liquid 310 spreads out in a direction away from the crowded equipotential lines to cover an entire region of the cell. It may be understood that the electric field may help the spreading of the first liquid 310 by putting force on a portion of the polar (P) polar second liquid 320 disposed away from the spreading direction of the first liquid 310.

When a time lapses by about 5 ms from the generation of the electric field, the first liquid 310 is likely to be divided near a region E where the equipotential lines are crowded. When the electric field continues to exist, a weak portion of the first liquid 310 may be broken by the electric force such that the nonpolar (NP) first body of liquid 310 is divided as is shown at about 6 ms into the simulation.

This phenomenon may explain the reason why the decrease in the response time in Experiment 2 shown in FIG. 6 is smaller than that in Experiments 4 and 5 shown in FIG. 8. That is, since the electric field due to the potential difference between the second electrode 120 and the third electrode 210 is maintained during the second period T2$_{(2)}$ in the driving method shown in FIG. 4, a drop of the first liquid 310 may spread out and then may be divided into two droplets. Thereafter, the two droplets may rejoin to form a single drop in order to stably display an image expected to be displayed in the second period T2$_{(2)}$. Therefore, it takes time for the first liquid 310 to be divided and to therefore join (coalesce) again, and thus the response time in a case such as shown in FIG. 10 may be greater than the response time in a case that the first liquid 310 spreads out without being divided. For example, in the driving method shown in FIG. 7, the division of the first liquid 310 may not occur (at all or as much) since the value changing duration Tp during which a potential difference is made between the second electrode 120 and the third electrode 210 is too short to cause the division.

Figure 11:
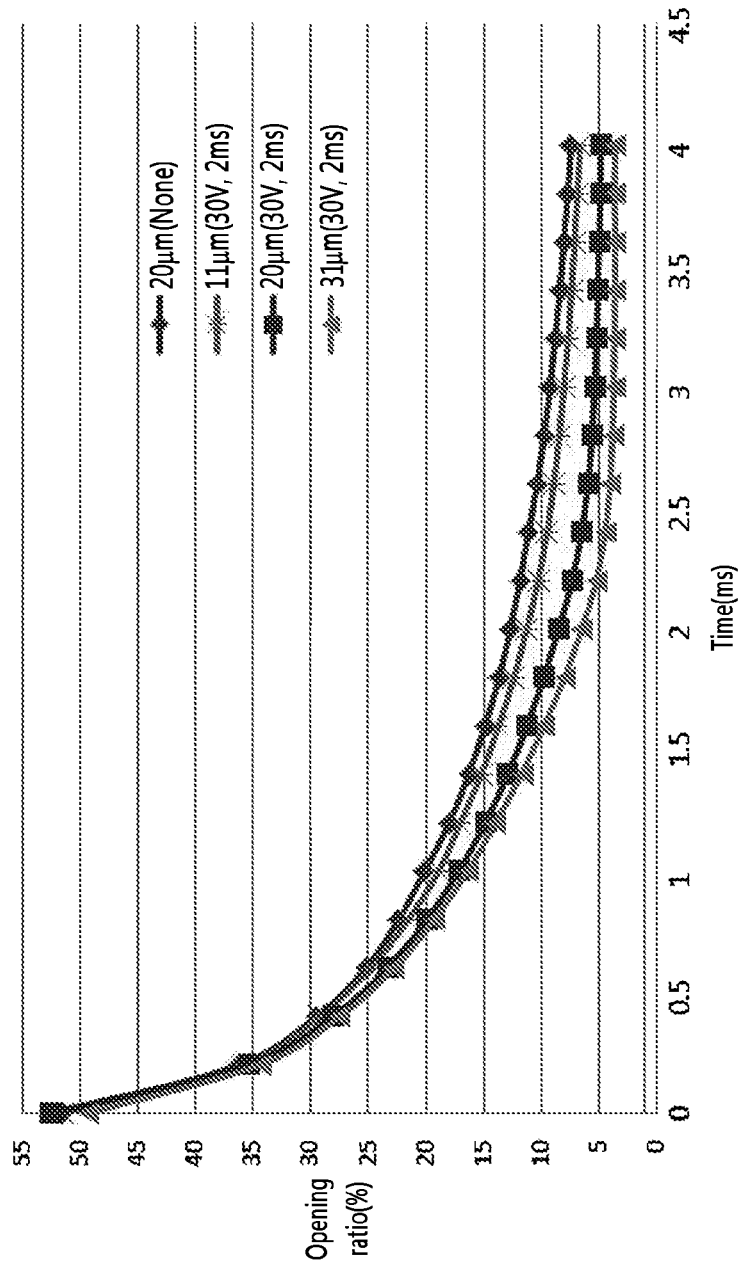
FIG. 11 is a graph showing time-dependent opening ratio of an electrowetting display device with various sizes of a second electrode.

FIG. 11 is a graph showing time-dependent opening ratio of an electrowetting display device with various sizes of a second electrode, which was simulated under a condition substantially the same as the condition in the simulation described with reference to FIGS. 9 and 10.

The vertical axis indicates an opening ratio in percentage (%), and the horizontal axis indicates time in milliseconds (ms). The opening ratio is defined as an area that is not covered by the first liquid 310 divided by an entire area (aperture area) of a cell surrounded by the partition wall 160. A maximum value of the opening ratio may be given for a predefined highest gray. The decreasing of the optically-measured opening ratio corresponds to the spreading of the nonpolar (NP) first liquid 310.

In the simulation, the opening ratio was measured under a condition that a potential difference of about 30V was given for about 2 ms between the second electrode 120 and the third electrode 210 based on the driving method shown in FIG. 7. The size of the second electrode 120 was about 11 µm, about 20 µm, and about 31 µm. The opening ratio for the second electrode 120 having a size of about 20 µm was also measured under a condition that there was no potential difference between the second electrode 120 and the third electrode 210 as denoted by "None" in FIG. 11.

A maximum value of the opening ratio in the simulation of FIG. 11 was about 53%. Referring to FIG. 11, a time for the opening ratio to be changed from the maximum value to another value becomes shorter as the second electrode 120 becomes larger. For example, a time for the opening ratio to be changed from the maximum value to about 10% of the maximum value in the presence of potential difference between the second electrode 120 and the third electrode 210 was about 1.58 ms, about 1.78 ms, and about 2.28 ms for the second electrode 120 having a size of about 31 µm, about 20 µm, and about 11 µm, respectively. The time in the absence of potential difference between the second electrode 120 and the third electrode 210 was about 2.72 ms, which is longer than the time in the presence of potential difference.

The spreading speed of the first liquid 310 is greater as the second electrode 120 is larger in the presence of the potential difference between the second electrode 120 and the third electrode 210. However, the maximum value of the opening ratio is made smaller as the second electrode 120 is made larger since the first liquid 310 may cover an entire area of the second electrode 120 regardless of the size of the second electrode 120 in the presence of the voltage difference between the first electrode 110 and the third electrode 210. Therefore, the second electrode 120 may be made substantially smaller than a minimum area on the lyophobic layer 140 that is occupiable by the first liquid 310.

When the surface of the lyophobic layer 140 is contaminated, the spreading speed of the first liquid 310 may be expected to be changed. The relation between the contamination of the surface of the lyophobic layer 140 and the spreading speed of the first liquid 310 is described with reference to FIGS. 12 and 13.

Figure 12:
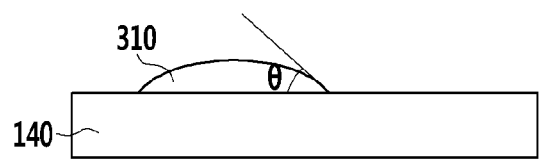
FIG. 12 is a schematic sectional view showing a first liquid disposed on a lyophobic layer.
Figure 13:
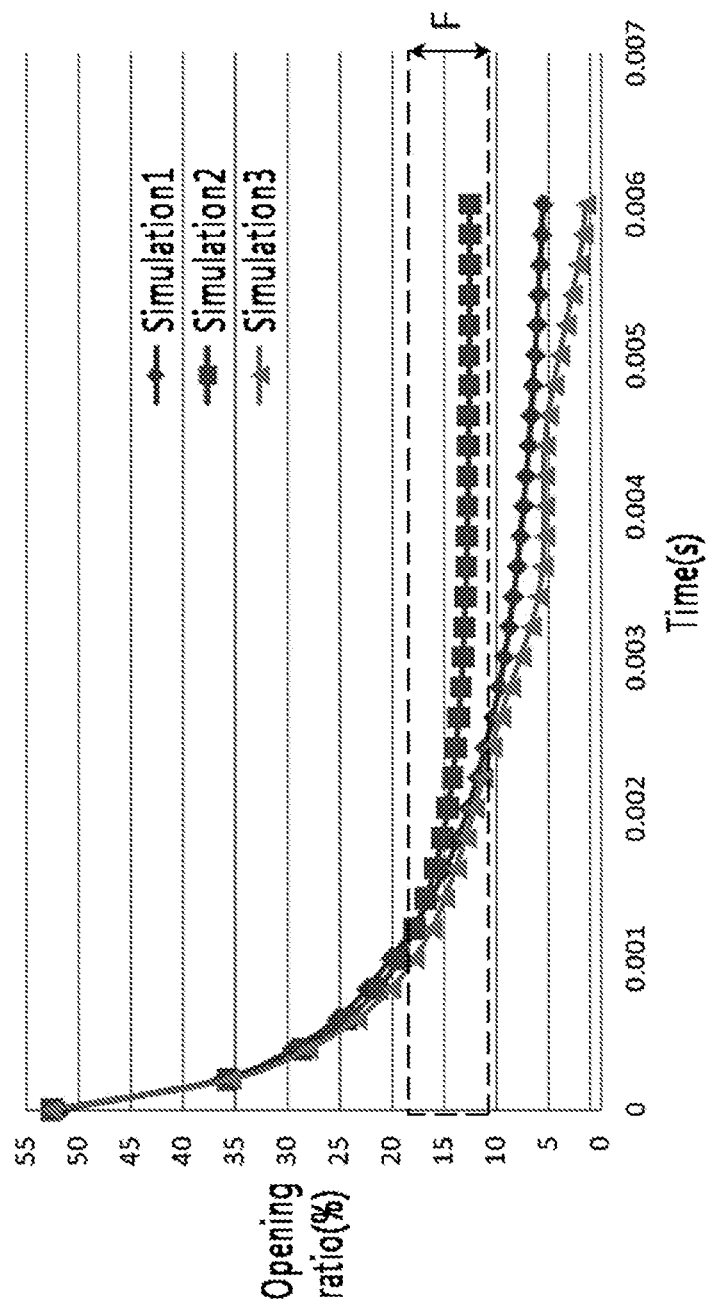
FIG. 13 is a graph showing a time-dependent opening ratio when a portion of a lyophobic layer is contaminated.

FIG. 12 is a schematic sectional view showing a first body of nonpolar liquid disposed on a lyophobic layer, and FIG. 13 is a graph showing a time-dependent opening ratio when a portion of a lyophobic layer is contaminated.

Referring to FIG. 12, when a liquid drop, for example, a first liquid 310 is disposed on a surface, for example, of a lyophobic layer 140, the first liquid 310 may make a wetting contact angle θ with the surface of the lyophobic layer 140.

When the surface of the lyophobic layer 140 is contaminated, the contact angle θ of the first liquid 310 may be increased to thereby slow down or to obstruct the spreading of the first liquid 310 onto the surface of the lyophobic layer 140 by means of surface wetting.

In Simulation 1, the contact angle θ was set to be about 10 degrees on an entire surface of the lyophobic layer 140. As for Simulations 2 and 3, on a portion of the lyophobic layer 140 that the first liquid 310 reaches when the opening ratio is from about 18% to about 11.5% as denoted by "F" in FIG. 13 (area of fault), the contact angle θ was set to be about 15 degrees such that a surface of the portion was assumed to be contaminated (having a wettability fault). The contact angle θ was set to be about 10 degrees on remaining portions of the lyophobic layer 140, which are assumed not to be contaminated.

In Simulations 1 and 2, there was no potential difference given between the second electrode 120 and the third electrode 210. In Simulation 3, the driving method shown in FIG. 7 was adopted such that a potential difference of about 30 V was given for about 4.5 ms between the second electrode 120 and the third electrode 210.

Other conditions of the simulation are substantially the same as those of the simulation described with reference to FIG. 9.

Referring to FIG. 13, in Simulation 1 without contamination of the lyophobic layer 140 and without potential difference between the second electrode 120 and the third electrode 210, the first liquid 310 may spread out quickly to decrease the opening ratio as a time lapses.

In Simulation 2 with contamination of the surface of the lyophobic layer 140 present and without potential difference between the second electrode 120 and the third electrode 210, the opening ratio decreases to about 12.5% and then the decrease of the opening ratio stops even though a time lapses. That is, the spreading of the first liquid 310 may substantially come to a stop at the contaminated portion of the lyophobic layer 140. It means that the contamination blocks the first liquid 310 from fully spreading out.

In Simulation 3 with contamination of the surface of the lyophobic layer 140 and with the driving method shown in FIG. 7, the spreading of the first liquid 310 may continue even while spreading on the contaminated portion to reach a farther portion beyond the contaminated portion unlike Simulation 2, and thus the opening ratio may decrease to a value lower than about 11.5% as a time goes by.

Therefore, the driving method according to the embodiments may make the first liquid 310 spread out better even when performed against an area of surface contamination.

The driving method described above with reference to FIG. 7 may have various modifications, which are described in detail with reference to FIGS. 14 to 16.

Figure 14:
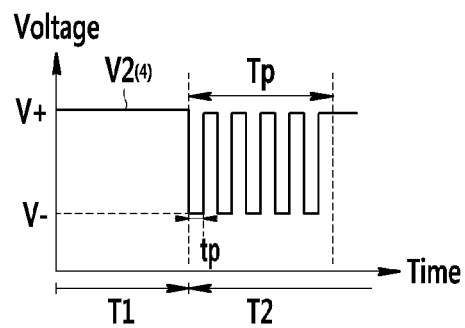
FIGS. 14 to 17 are graphs showing various forms of a voltage applied to the second electrode of the electrowetting display device shown in FIGS. 1 and 2 according to embodiments.
Figure 15:
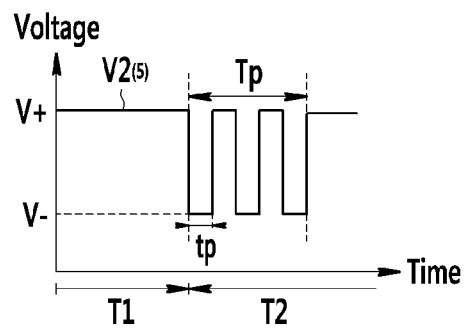
Figure 16:
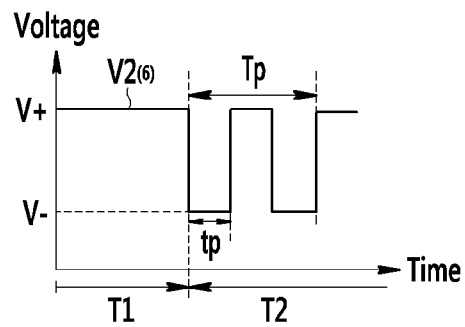

FIGS. 14 to 16 are graphs showing various forms of a voltage applied to the second electrode of the electrowetting display device shown in FIGS. 1 and 2 according to embodiments.

Referring to FIGS. 14 to 16, corresponding voltages $V2_{(4)}$, $V2_{(5)}$ or $V2_{(6)}$ applied to the second electrode 120 of the electrowetting display device 1 shown in FIGS. 1 and 2 includes a plurality of pulses in a value changing duration Tp. The number of the pulses included in the voltages $V2_{(4)}$, $V2_{(5)}$ or $V2_{(6)}$ in the value changing duration Tp is five, three, or two, respectively for the allowed time for aperture closing. The first electrode 110 and the third electrode 210 may be are supplied with the voltages $V1_{(3)}$ and $V3_{(3)}$ shown in FIG. 7, respectively.

The voltages $V2_{(4)}$, $V2_{(5)}$ or $V2_{(6)}$ may have the voltage value V+, which is applied to the third electrode 210, during time durations other than the value changing duration Tp. The voltages $V2_{(4)}$, $V2_{(5)}$ or $V2_{(6)}$ may have the voltage value V+ during time duration(s) between adjacent pulses, but example embodiments are not limited thereto. The voltage $V2_{(4)}$, $V2_{(5)}$ or $V2_{(6)}$ may have a value different from the voltage value V+ during at least one of the time durations between adjacent pulses.

A pulse may have a peak value lower than the voltage value V+, and for example, the peak value may be the same as the voltage value V−, which is applied to the first electrode 110 during a first period T1. However, the peak value may be higher than the voltage value V+. All the pulses may have substantially the same peak value, but the peak value of at least one of the pulses may be different from the peak value of another of the pulses. All the pulses may have substantially the same width, but the width of at least one of the pulses may be different from the width of another of the pulses. The distances between adjacent pulses may be substantially the same, but the distance between a pair of adjacent pulses may be different from the distance between another pair of adjacent pulses.

In a simulation, the response time was measured ten times for each of the voltages $V2_{(4)}$, $V2_{(5)}$ and $V2_{(6)}$ shown in FIGS. 14 to 16 while the voltage $V2_{(4)}$, $V2_{(5)}$ or $V2_{(6)}$ shown in FIGS. 14 to 16 was applied to the second electrode 120, and the voltages $V1_{(3)}$ and $V3_{(3)}$ shown in FIG. 7 were applied to the first and third electrodes 110 and 210, respectively. All the pulses in each of the voltages $V2_{(4)}$, $V2_{(5)}$ and $V2_{(6)}$ were set to have the same peak value of V− and the same width tp. The distances between adjacent pulses in each of the voltages $V2_{(4)}$ and $V2_{(5)}$ were set to be substantially the same. Each of the voltages $V2_{(4)}$, $V2_{(5)}$ and $V2_{(6)}$ was set to have the voltage value V+ during the time durations other than the pulses.

The voltage values V+ and V− were about 15 V and about −15 V, respectively. The value changing duration Tp was about 10 ms for the voltages $V2_{(4)}$ and $V2_{(5)}$ shown in FIGS. 14 and 15, and about 9.99 ms for the voltage shown in FIG. 16. The width tp of each pulse was about 1.0 ms for the voltage $V2_{(4)}$ shown in FIG. 14, about 2.0 ms for the voltage $V2_{(5)}$ shown in FIG. 15, and about 3.33 ms for the voltage shown in FIG. 16.

The average of the measured response time was about 18.88 ms for the voltage $V2_{(4)}$ shown in FIG. 14, about 17.29 ms for the voltage $V2_{(5)}$ shown in FIG. 15, and about 15.39 ms for the voltage shown in FIG. 16, which are shorter than about 39 ms, the average of the measured response time in Experiment 3 shown in FIG. 8.

Although the above-described driving methods of an electrowetting display device relate to a transition from the highest gray to the lowest gray, the methods can be applied to a transition from any higher gray to any lower gray, which is described in detail with reference to FIG. 17.

Figure 17:
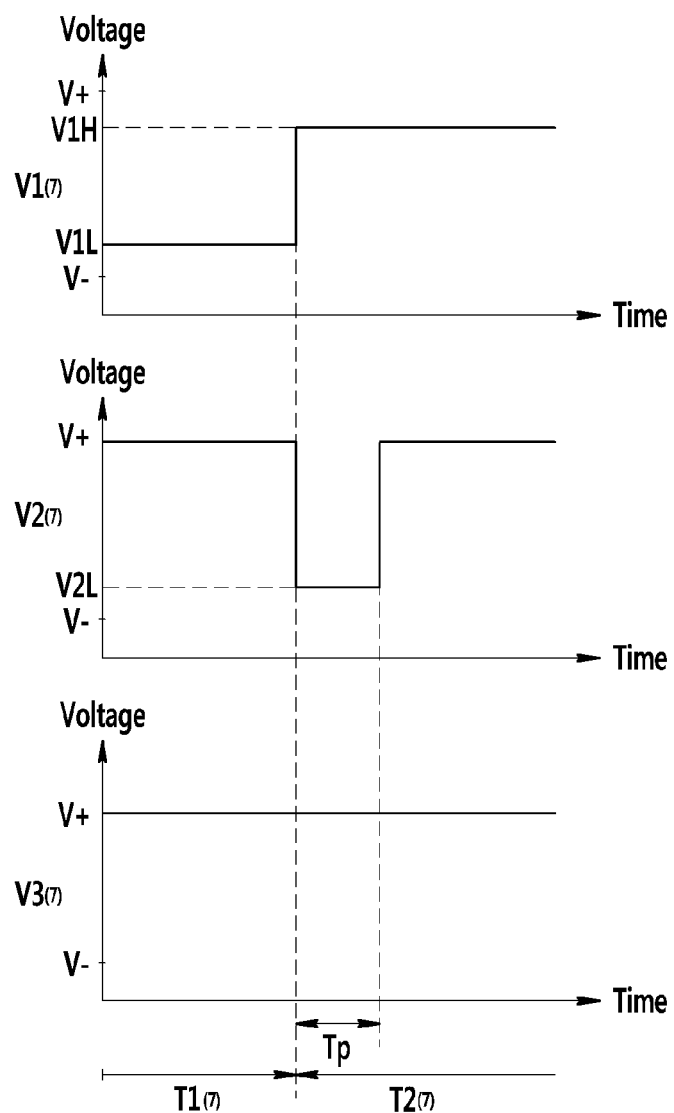

FIG. 17 is a waveform diagram of driving voltages of an electrowetting display device according to further example embodiments.

Referring to FIG. 17, the voltage $V1_{(7)}$ applied to the first electrode 110 may have a value V1 while the voltages $V2_{(7)}$ and $V3_{(7)}$ respectively applied to the second and third electrodes 120 and 210 has a value V+ during a first period $T1_{(7)}$. When the value V1L is substantially equal to the value V−, the electrowetting display device 1 displays the highest gray. However, when the value V1L is closer to the value V+ than the value V−, the electrowetting display device 1 displays a first gray or an initial gray lower than the highest gray.

There is a potential difference between the first electrode 110 and the third electrode 210, and there is substantially no potential difference between the second electrode 120 and the third electrode 210. Therefore, an electric field generated in the space between the first panel 100 and the second panel 200 is stronger in a first region between the first electrode 110 and the third electrode 210 than in a second region between the second electrode 120 and the third electrode 210. The first liquid 310 may be forced to move toward the second region and may stop to cover a first area of a cell including the second electrode 120, thereby displaying the first gray.

At the beginning of a second period $T2_{(7)}$, the voltage $V1_{(7)}$ of the first electrode 110 is raised from the value V1L to another value V1H closer to the value V+ than the value V1L. When the value V1H is substantially equal to the value V+, the electrowetting display device 1 will display the lowest gray after a value changing duration Tp. However, when the value V1H is lower than the value V+, the electrowetting display device 1 will display a second gray or a target gray higher than the lowest gray and lower than the initial gray after the value changing duration Tp.

In addition, the voltage $V2_{(7)}$ of the second electrode 120 is lowered from the value V+ to another value V2L, maintains the value V2L during the value changing duration Tp. The voltage $V3_{(7)}$ of the third electrode 210 is fixed to the value V+.

There are potential differences between the first electrode 110 and the third electrode 210, and between the second electrode 120 and the third electrode 210, and the potential difference between the second electrode 120 and the third electrode 210 is greater than the potential difference between the first electrode 110 and the third electrode 210. Therefore, an electric field generated in the space between the first panel 100 and the second panel 200 is stronger in the second region than in the first region, and thus the first liquid 310 may be forced to move toward the first region.

After the value changing duration Tp, the voltage $V2_{(7)}$ of the second electrode 120 is raised from the value V3 to the value V+ again, while the voltages $V1_{(7)}$ and $V3_{(7)}$ of the first electrode 110 and the third electrode 210 do not change their values. The potential difference between the second electrode 120 and the third electrode 210 is removed while the potential difference between the first electrode 110 and the third electrode 210 is still remained. The value V2L may be substantially the same as the value V1L.

Therefore, an electric field generated in the space between the first panel 100 and the second panel 200 is stronger in the first region than in the second region, and thus the first liquid 310 may be forced to move toward the second region by the electric field. However, the repulsive force applied to the polar (P) second liquid 320 by the lyophobic layer 140 may cause a force on the nonpolar (NP) first liquid 310, which forces the first liquid 310 to move toward the first region.

As a result, the first liquid 310 may move toward the second region or the first region based on the two forces applied thereon, and may stop its movement at a position where the two forces are balanced such that the electrowetting display device 1 displays the target gray.

In order to reduce a time for transition from the initial gray to the target gray, the value changing duration Tp may be finished before the first liquid 310 advancing toward the first region arrives at the above-described balancing position. Then, the movement of the first liquid 310 toward the first region may slow down after the value changing duration Tp and then the first liquid 310 may reach the balancing position and stop its movement.

The waveform of the voltage $V2_{(7)}$ may be substituted with those shown in FIGS. 14 to 16.

Although FIG. 17 shows that the voltages $V1_{(7)}$ and $V2_{(7)}$ applied to the first and second electrodes 110 and 120 are substantially equal to or lower than the voltage $V3_{(7)}$ applied to the third electrode 210, the voltages $V1_{(7)}$ and $V2_{(7)}$ of the first and second electrodes 110 and 120 may be substantially equal to or higher than the voltage $V3_{(7)}$ of the third electrode 210. According to an embodiment, the voltages $V1_{(7)}$ and $V2_{(7)}$ may be those shown in FIG. 11 reversed with respect to the voltage $V3_{(7)}$.

An electrowetting display device according to example embodiments is described in detail with reference to FIG. 18.

Figure 18:
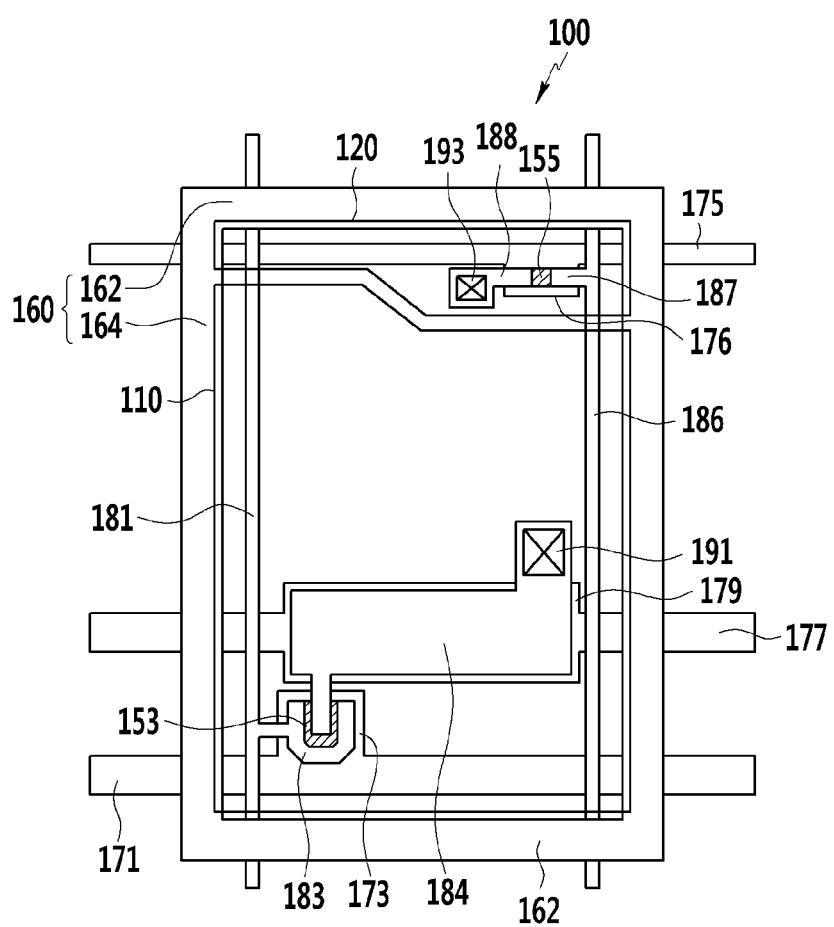
FIG. 18 is a layout view of a first panel of an electrowetting display device according to example embodiments.

FIG. 18 is a layout view of a first panel of an electrowetting display device according to an example embodiment.

An electrowetting display device according to this embodiment may have a cross section shown in FIGS. 1 and 2 or 9. Although FIG. 18 shows only a single cell surrounded by a partition wall 160, a first panel 100 of the electrowetting display device according to this embodiment may include a plurality of cells arranged adjacent to one another and repeated in rows and columns.

Referring to FIGS. 1, 2 and the top layout embodiment of FIG. 18, in FIG. 18 there are provided: a first gate line 171, a second gate line 175, and a storage electrode line 177 disposed on a first substrate 101. The first and second gate lines 171 and the storage electrode line 177 may extend in a transverse or horizontal direction (X axis). The storage electrode line 177 is located between the first gate line 171 and the second gate line 175. The first gate line 171 includes a first gate electrode 173 integrally branching out therefrom. The second gate line 175 includes a second gate electrode 176 integrally branching out therefrom. The storage electrode line 177 includes a storage electrode 179 integrally branching out therefrom. The first and second gate lines 171 and 175 may respectively transmit respective gate-on voltages for turning on respective thin film transistors (TFTs) of each. The first and second gate lines 171 and 175 and the storage electrode line 177 may have a dual-layered conductive line structure including a first conductive layer and a second conductive layer. According to an embodiment, the first conductive layer may include Ti or a Ti alloy, and the second conductive layer may include Cu or a Cu alloy. According to other embodiments, exemplary combinations of conductive materials for the first and second layers may include one or more of Mo and Al, CuMn and Cu, or Mo—Cu.

A gate insulating layer (not shown) may be disposed on the first gate line 171, the second gate line 175, and the storage electrode line 177.

A first semiconductive member 153 and a second semiconductive member 155 are disposed on the gate insulating layer. The first and second semiconductive members 153 and 155 may be located on the first and second gate electrodes 173 and 176, respectively. The first and second semiconductive members 153 and 155 may include amorphous silicon or a III-IV compound semiconductor. Alternatively, they may include a semiconductive oxide.

A first data line 181 and a second data line 186 are disposed on the gate insulating layer. The first and second data lines 181 and 186 cross the first and second gate lines 171 and 175 and the storage electrode line 177, and may extend in a longitudinal or vertical direction (Y axis). The first data line 181 includes a first source electrode 183 disposed on the first semiconductor member 153, and the second data line 186 includes a second source electrode 187 disposed on the second semiconductor member 155.

A first drain electrode 184 is disposed opposite the first source electrode 183. A second drain electrode 188 is disposed opposite the second source electrode 187. The first drain electrode 184 includes a portion overlapping the first semiconductor member 153 and an expansion overlapping the storage electrode 179. The expansion of the first drain electrode 184 and the storage electrode 179 may form a storage capacitor. A portion of the second drain electrode 188 overlaps the second semiconductor member 155.

The first and second data lines 181 and 186 and the first and second drain electrodes 184 and 188 may have a dual-layered conductive line structures including Mo and Al or Ti and Cu. According to other examples, the first and second data lines 181 and 186 and the first and second drain electrodes 184 and 188 may have a triple-layered conductive line structures including GaZnO—Cu—CuMn, or CuMn—Cu—CuMn where the hyphen here indicates the interlayer interface between the triple layers.

The first gate electrode 173, the first semiconductor member 153, the first source electrode 183, and the first drain electrode 184 form a first thin film transistor. The second gate electrode 176, the second semiconductor member 155, the second source electrode 187, and the second drain electrode 188 form a second thin film transistor.

An insulating layer (not shown) may be disposed on the first and second data lines 181 and 186 and the first and second drain electrodes 184 and 188. The insulating layer has a first contact hole 191 and a second contact hole 193 formed therethrough. The first contact hole 191 exposes and communicates with a portion of the first drain electrode 184, and the second contact hole 193 exposes and communicates with a portion of the second drain electrode 188.

A first electrode 110 and a second electrode 120 are disposed on the insulating layer. The first electrode 110 and the second electrode 120 are spaced apart from each other, and may include a transparent conductor such as indium tin oxide (ITO) or indium zinc oxide (IZO). The second electrode 120 may be larger in area than a minimum area that can be occupied by the first liquid 310 (shown in FIGS. 1 and 2) as described above.

The first electrode 110 may be electrically connected to the first drain electrode 184 of the first TFT through the first contact hole 191. The second electrode 120 may be electrically connected to the second drain electrode 188 of the second TFT through the second contact hole 193. A voltage signal transmitted from the first data line 181 may be applied to the first electrode 110 through the first TFT while the first gate line 171 is supplied with a gate-on voltage. A voltage signal transmitted from the second data line 186 may be applied to the second electrode 120 through the second TFT while the second gate line 175 is supplied with a gate-on voltage. The voltages transmitted by the first data line 181 and the second data line 186 may be the driving voltages mentioned above according to the embodiments shown in FIG. 4 or FIG. 7.

The above-described storage capacitor may sustain the voltage of the first electrode 110 after the first gate line 171 is supplied with an off-voltage to turn off the first TFT.

A protection layer 130 and a lyophobic layer 140 are disposed on the first and second electrodes 110 and 120. The protection layer 130 may include a silicon oxide ($SiO_x$) and/or a silicon nitride ($SiN_y$), and the lyophobic layer 140 may include a fluoropolymer.

A partition wall 160 is disposed on the lyophobic layer 140. The partition wall 160 may have a shape of a rectangle having transverse portions 162 and longitudinal portions 164. The transverse portions 162 may extend substantially parallel to the gate lines 171 and 175, and the longitudinal portions 164 may extend substantially parallel to the data lines 181 and 186. The first and second gate lines 171 and 175 and the first and second data lines 181 and 186 pass through an area enclosed by the partition wall 160. At least one of the portions 162 and 164 of the partition wall 160 may be disposed so as to not overlap the first and second electrodes 110 and 120 and may be spaced apart from the first and second electrodes 110 and 120. For example, a lower one of the transverse portions 162 of the partition wall 160 does not overlap the first and second electrodes 110 and 120 such that a lower edge of the first electrode 110 disposed opposite the second electrode 120 is spaced apart from an upper edge of the lower transverse portion 162 of the partition wall 160 as shown in FIG. 18.

While this disclosure has been described in connection with what is presently considered to be practical exemplary embodiments, it is to be understood that the present teachings are not limited to the disclosed embodiments, but, on the contrary, they are intended to cover various modifications and equivalent arrangements included within the spirit and scope of the present disclosure of invention.

What is claimed is:

1. A method of driving a display device, where the display device comprises a first electrode having a respective first surface disposed in a first area, a second electrode having a respective second surface disposed in a second area, the second electrode being spaced apart from the first electrode, a lyophobic layer provided over the respective first and second surfaces of the first and second electrodes, a first partition wall on the lyophobic layer and a second partition wall on the lyophobic layer, a third electrode spaced apart from above, and facing the lyophobic layer, the method comprising:
providing a first body of a first liquid as a first layer having a first thickness on the lyophobic layer, wherein the first layer extends from the first partition wall to the second partition wall;
providing a second body of a second liquid as a second layer between the first layer and the third electrode, wherein the second layer extends from the first partition wall to the second partition wall, the second body of the second liquid being immiscible with the first body of the first liquid and the lyophobic layer being lyophobic with respect to the second liquid; and
providing a first potential difference between the first electrode and the third electrode, causing the first liquid to coalesce over the second electrode in the second area, wherein the first liquid coalesces to have a second thickness that is greater than the first thickness;
while reducing the first potential difference, providing a potential difference waveform between the second electrode and the third electrode, wherein the potential difference waveform includes two or more pulses, causing at least part of the first liquid to start spreading movement towards the first area; and
at least partly after reducing the first potential difference, ceasing to provide the potential difference waveform, causing the at least part of the first liquid to slow down in the spreading movement toward the first area or to stop the spreading movement toward the first area.

2. The method of claim 1, wherein the first liquid entirely covers the second area.

3. The method of claim 1, wherein the providing of the potential difference waveform comprises:
applying a substantially constant voltage signal to the third electrode.

4. The method of claim 1, wherein there is substantially no potential difference between the second electrode and the third electrode during the providing of the first potential difference.

5. The method of claim 4, wherein:
a first voltage signal applied to the first electrode has a first value in the providing of the first potential difference and has a second value different from the first value in the providing of the potential difference waveform;
a second voltage signal applied to the second electrode has a third value different from the first value and the second value in the providing of the first potential difference,
the second voltage signal applied to the second electrode either (i) has a fourth value or (ii) swings between the fourth value and the first value in the providing of the potential difference waveform; and
a second voltage signal applied to the third electrode maintains the third value during the providing of the first voltage difference, and during the providing of the potential difference waveform.

6. The method of claim 1, wherein the first liquid is disposed in a first state when there is substantially no potential difference between the first electrode, the second electrode and the third electrode, and wherein the first liquid is disposed in a second state when the first potential difference is provided.

7. The method of claim 5, wherein the first value has a polarity different from a polarity of the second value.

8. The method of claim 1, wherein the first liquid forms as a coalesced single body of the first liquid during the providing of the potential difference waveform.

9. A method of driving a display device, where the display device has a first electrode, a second electrode spaced apart from the first electrode, a lyophobic layer disposed on the first and second electrodes, a third electrode spaced apart from and facing the lyophobic layer, a first liquid (i) disposed in a space between the lyophobic layer and the third electrode and (ii) having a first thickness, and a second liquid disposed in the space, the second liquid being immiscible with the first liquid, the lyophobic layer being lyophobic relative to the second liquid, the method comprising:
providing a potential difference between the first electrode and the third electrode to move the first liquid to be over the second electrode such that the first liquid has a second thickness greater than the first thickness, and to display a first grayscale level; and
while reducing the potential difference, providing a potential difference waveform between the second electrode and the third electrode, wherein the potential difference waveform includes two or more pulses, and to thereby transition from displaying the first grayscale level to displaying a target grayscale level different from the first grayscale level;
after reducing the potential difference, ceasing to provide the potential difference waveform before completing the transition; and
at least partly in response to ceasing to provide the potential difference waveform before completing the transition, causing the target grayscale level to be displayed.

10. The method of claim 9, wherein the first liquid covers an entire area of the second electrode.

11. The method of claim 9, wherein the providing of the potential difference waveform comprises:
applying a substantially constant voltage to the third electrode.

12. The method of claim 9, wherein there is substantially no potential difference between the second electrode and the third electrode during the providing of the potential difference.

13. A method of driving a display device including a first electrode, a second electrode spaced apart from the first electrode, a lyophobic layer on the first and second electrodes, a first partition wall on the lyophobic layer and a second partition wall on the lyophobic layer, and a third electrode facing the lyophobic layer, the method comprising:
providing a first body of a first liquid as a first layer having a first thickness on the lyophobic layer, wherein the first layer extends from the first partition wall to the second partition wall;
providing a second body of a second liquid as a second layer between the first layer and the third electrode, wherein the second layer extends from the first partition wall to the second partition wall, the second body of the second liquid being immiscible with the first body of the first liquid and the lyophobic layer being lyophobic with respect to the second liquid;
providing an electric field that is stronger in a first region between the first electrode and the third electrode than in a second region between the second electrode and the third electrode to thereby cause the first liquid to coalesce over the second electrode in the second region while the second liquid is caused to move into the first region, wherein the first liquid coalesces to have a second thickness that is greater than the first thickness;
providing an electric field in the second region that is stronger than a field, if any, present in the first region to thereby cause a movement of the first liquid toward the first region; and
providing a pulsed electric field weaker in the second region than in the first region before the movement of the first liquid toward the first region stops, thereby slowing down or stopping the movement of the first liquid toward the first region.

14. The method of claim 13, wherein the first liquid is a nonpolar liquid including a nonpolar dye.

15. A method of driving a display device including a first electrode, a second electrode spaced apart from the first electrode, a lyophobic layer on the first and second electrodes, a third electrode facing the lyophobic layer, a first liquid (i) in a space between the lyophobic layer and the third electrode and (ii) having a first thickness, and a second liquid in the space, the second liquid being immiscible with the first liquid, the lyophobic layer being lyophobic to the second liquid, the method comprising:
providing a potential difference between the first electrode and the third electrode to move the first liquid over the second electrode such that the first liquid has a second thickness greater than the first thickness, and to display a first grayscale level; and
while reducing the potential difference, providing a potential difference waveform between the second electrode and the third electrode during a duration, wherein the potential difference waveform includes two or more pulses that are applied during the duration; and after reducing the potential difference, ceasing to provide the potential difference waveform to thereby display a target grayscale level different from the first grayscale level, wherein a time span for reducing the potential difference is shorter than a time span for the transition from the first grayscale level to the target grayscale level.

16. The method of claim 15, wherein the number of voltage pulses included in the potential difference waveform that are applied during the duration is in a range from two to five.

* * * * *